(12) United States Patent
Newell

(10) Patent No.: US 11,740,670 B2
(45) Date of Patent: Aug. 29, 2023

(54) SYSTEMS AND METHODS FOR AUTOMATED BATTERY REPLACEMENT

(71) Applicant: DISH NETWORK L.L.C., Englewood, CO (US)

(72) Inventor: Nicholas Brandon Newell, Centennial, CO (US)

(73) Assignee: DISH Network L.L.C., Englewood, CO (US)

( * ) Notice: Subject to any disclaimer, the term of this patent is extended or adjusted under 35 U.S.C. 154(b) by 705 days.

(21) Appl. No.: 16/573,751

(22) Filed: Sep. 17, 2019

(65) Prior Publication Data

US 2021/0081014 A1  Mar. 18, 2021

(51) Int. Cl.
*G06F 1/26* (2006.01)
*G06K 7/10* (2006.01)
(Continued)

(52) U.S. Cl.
CPC .............. *G06F 1/263* (2013.01); *G06F 21/44* (2013.01); *G06K 7/10366* (2013.01);
(Continued)

(58) Field of Classification Search
CPC ...... G06F 21/44; G06F 1/263; G06K 7/10366
(Continued)

(56) References Cited

U.S. PATENT DOCUMENTS 9,139,310 B1 * 9/2015 Wang .................... B64C 39/024
2013/0257349 A1 * 10/2013 Yang ..................... H02J 7/0042
320/107
(Continued)

FOREIGN PATENT DOCUMENTS

| CN | 209634443 U | * | 11/2019 | |
|---|---|---|---|---|
| CN | 112918676 A | * | 6/2021 | ........... B64C 39/024 |
| JP | 2010516546 A | * | 1/2008 | ........... B64C 39/024 |

*Primary Examiner* — Edwyn Labaze
(74) *Attorney, Agent, or Firm* — Perkins Coie LLP

(57) ABSTRACT

Examples of the present disclosure describe systems and methods for automated battery replacement. In example aspects, a notification is transmitted to a central hub from an IoT device, alerting the central hub of battery status information. Based on the battery status information, a robot may be deployed from the hub to replace the battery or batteries on the IoT device. The robot may be land-based, air-based, or sea-based, among other configurations and combinations. The robot may engage the IoT device by connecting an external power source, which triggers an authentication procedure to verify the authenticity of the IoT device and the robot. Upon successful authentication, the main battery compartment hatch may be opened. In some example aspects, the main battery compartment hatch is controlled using magnets (e.g. electromagnets). A successful authentication process may result in a change of magnetic force, which may cause the battery compartment hatch to open. Upon opening of the battery compartment hatch, the robot may remove the old battery and insert a new battery. The IoT device may run at least one test on the new battery to ensure proper functionality. Upon verifying proper functionality, the IoT device and robot may disengage, and the IoT device may resume normal operations with the newly installed battery.

20 Claims, 7 Drawing Sheets

(51) Int. Cl.
  *G06F 21/44* (2013.01)
  *H04L 9/06* (2006.01)
  *G05D 1/02* (2020.01)
  *H02J 7/00* (2006.01)

(52) U.S. Cl.
  CPC ........... *H04L 9/0618* (2013.01); *G05D 1/021* (2013.01); *G05D 1/0202* (2013.01); *G05D 1/0206* (2013.01); *H02J 7/0047* (2013.01)

(58) Field of Classification Search
  USPC ........................................ 700/245, 250, 258
  See application file for complete search history.

(56) References Cited

U.S. PATENT DOCUMENTS

| | | | |
|---|---|---|---|
| 2018/0086453 A1* | 3/2018 | Scott-Nash | G08G 5/0069 |
| 2018/0104829 A1* | 4/2018 | Altman | H01M 10/46 |
| 2018/0194466 A1* | 7/2018 | Zhao | G05D 1/102 |
| 2019/0084432 A1* | 3/2019 | Liang | B60L 53/80 |
| 2019/0369641 A1* | 12/2019 | Gillett | G05D 1/0027 |
| 2021/0380016 A1* | 12/2021 | Cha | H04W 4/46 |

* cited by examiner

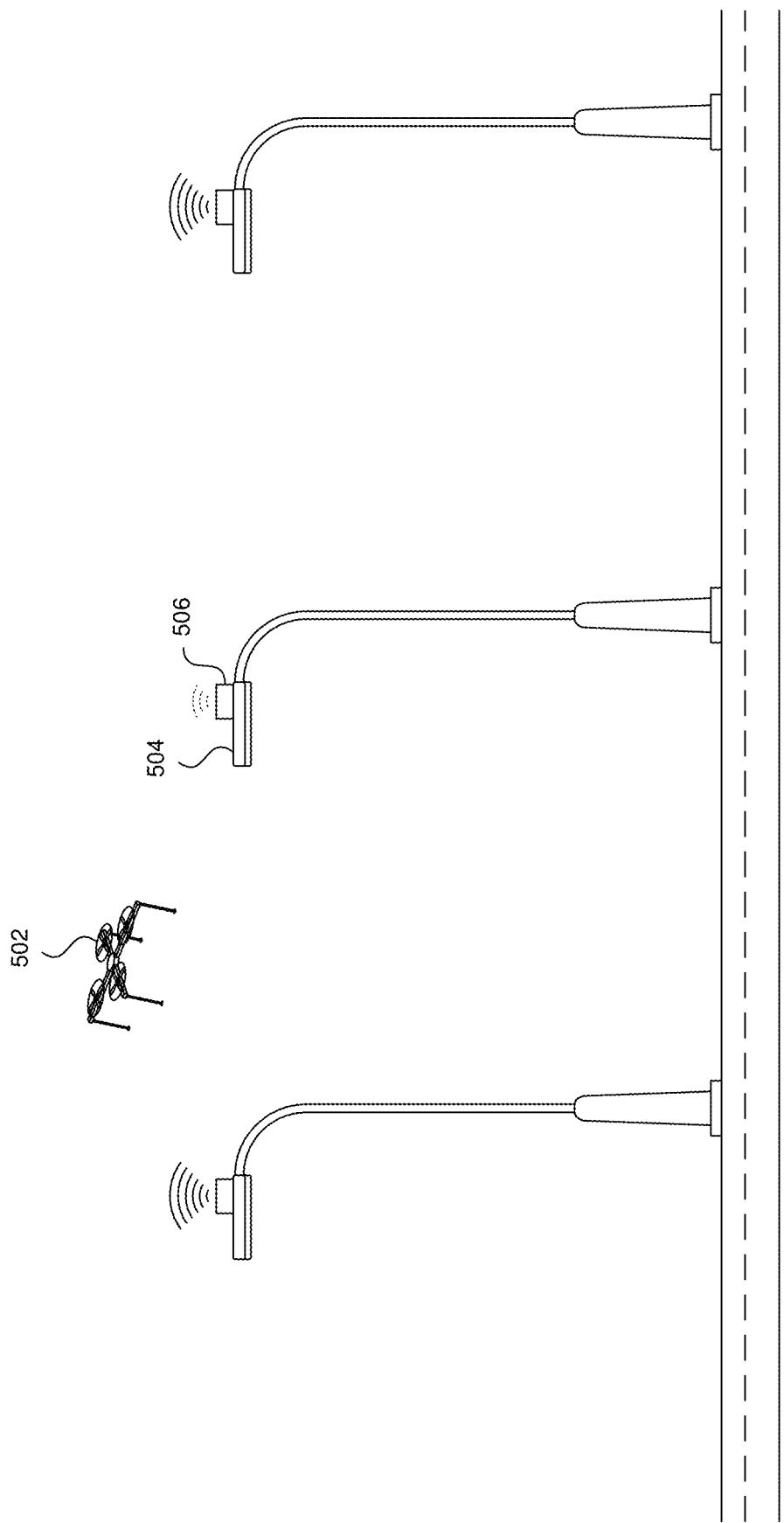

SYSTEMS AND METHODS FOR AUTOMATED BATTERY REPLACEMENT

TECHNICAL FIELD

The present disclosure is related to the fields of robotics, Internet of Things (IoT), and battery replacement. More particularly, the present disclosure is directed at an automated system for replacing a battery or batteries in an IoT device using a robotic means, such as a land-dwelling robot or an unmanned aerial vehicle (UAV), among other robotic machines. A robotic machine may engage an IoT device with an old battery and provide the IoT device with temporary external power. The robot and IoT device may conduct an authentication protocol before the IoT device releases the battery compartment for the robot to replace the battery. After authentication, the robot can then extract the old battery and insert a new battery into the battery compartment of the IoT device. Application of such automated battery replacement using robotic means is both convenient and cost-effective, especially as more IoT devices continue to be installed in remote locations that are often difficult for humans to access.

BACKGROUND

Advances to the industrial internet will be accelerated through increased network agility, integrated artificial intelligence (AI) and the capacity to deploy, automate, orchestrate, and secure diverse use cases at hyperscale. These advances in technology will enable billions of devices simultaneously to come online and communicate with one another. These devices are known as "IoT devices." An IoT device, as the term is used herein, is a computing device that connects wirelessly to a network and has the ability to transfer and receive data. Consumer-connected IoT devices may include smart TVs, smart speakers, toys, wearables, and smart appliances. Smart meters, commercial security systems, and smart city technologies—such as those used to monitor traffic and weather conditions—are also examples of industrial and enterprise IoT devices. Other technologies, including smart air conditioners, smart thermostats, smart lighting and smart security, span home, enterprise, and industrial uses.

Each of these IoT devices require power, and many will be powered by batteries. Over time, these IoT devices may run out of battery power and require a replacement battery. Currently, battery replacement is typically completed manually, where a human technician physically accesses the IoT device, removes the old battery, and inserts the new battery. Such a method of battery replacement is both inconvenient and not cost effective, especially at scale when billions of IoT devices will eventually require a battery replacement. Furthermore, because using human technicians is the typical method for battery replacement, current battery replacement methods lack a security mechanism to prevent tampering with the IoT device and its battery or batteries. Most IoT devices are only equipped with a weak, plastic battery cover that can be opened by pressing down on a single tab. Such a design allows for increased tampering and theft of the batteries and other parts of the IoT device. Thus, there is a need for an automated and secure system of battery replacement that can address the inefficiencies of current battery replacement methods that rely on human technicians.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

FIG. 5 illustrates an example environment of operation of the disclosed technology.

DETAILED DESCRIPTION

Figure 1:
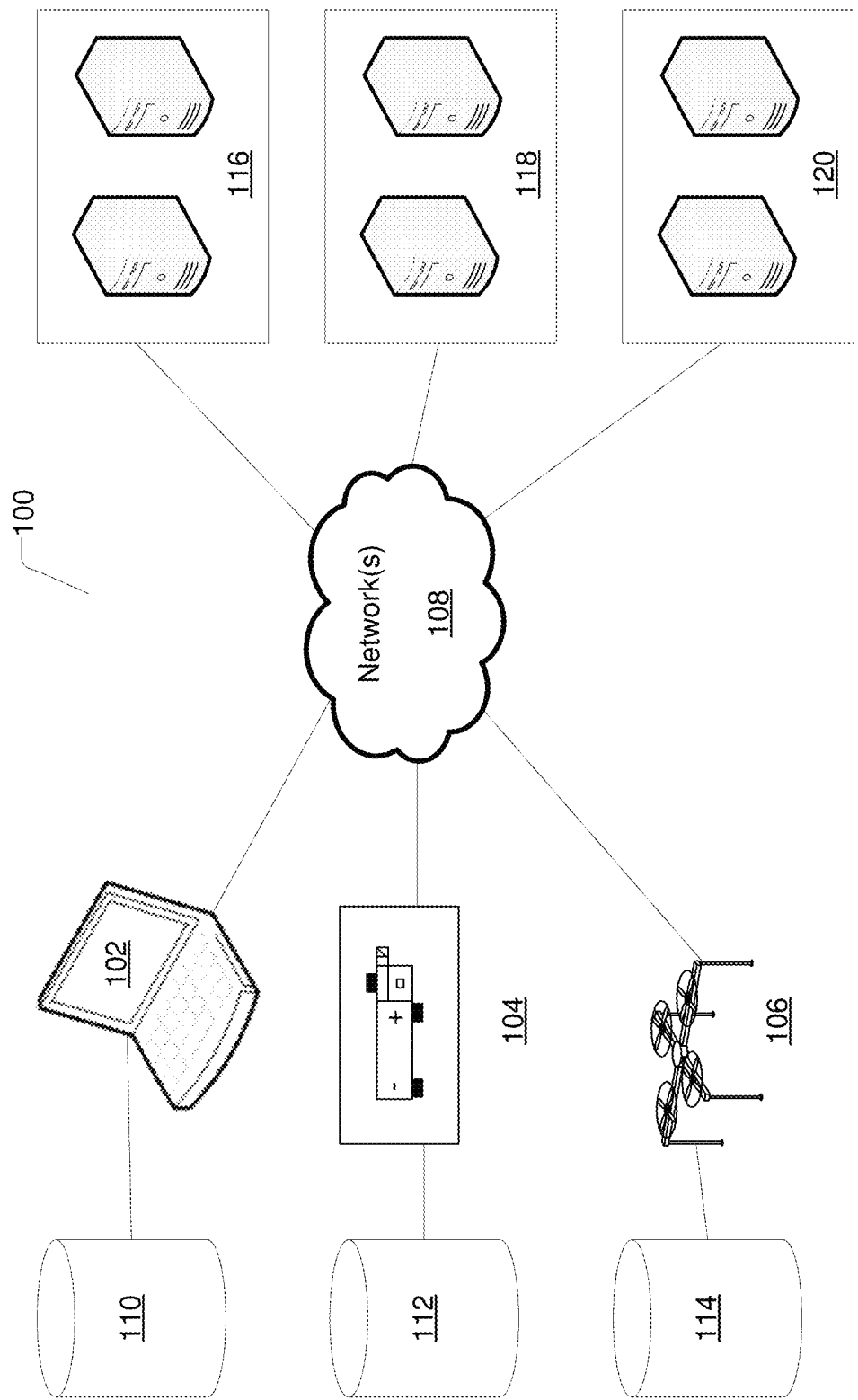
FIG. 1 illustrates an example of a distributed system for automated battery replacement.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Embodiments of the present application are directed at systems and methods for automated battery replacement. In some aspects, a robot may be used to engage an IoT device to replace the battery or batteries of the IoT device. The term "robot" as used herein refers to any type of machine that functions automatically. In some examples, a robot may be a land-based robot (e.g., land-based wheeled robot, land-based traced robot, land-based legged robot, etc.). In other examples, a robot may be an air-based robot (e.g., a UAV or drone, autonomous airplane, autonomous helicopter, autonomous blimp, etc.). In yet other examples, a robot may be a water-based robot (E.g., an unmanned underwater vehicle, autonomous submarine, aquatic robot, etc.).

In example scenarios, an IoT device may be running low on battery power. Because the IoT device is able to receive and transfer data, the IoT device communicates to a central hub over a connected network, alerting the hub that it is low on battery. The hub, for example, may be a robot dispatch center. Upon receiving the message from the IoT device, the hub may dispatch an appropriately outfitted robot to access the IoT device and replace its battery.

In some examples, an IoT device may be configured with a temporary power outlet and a temporary power outlet hatch that is closed and released using a basic magnet. In one example, a robot may also be equipped with a basic magnet with an opposite magnetism. When the robot approaches the IoT device, the robot may move its basic magnet so that it is proximal to the basic magnet of the IoT device. Once the magnets are within a certain proximity, the magnetic force causes the basic magnet of the IoT device to release the hatch covering the temporary power outlet. For example, the basic magnet on the IoT device may be locking the temporary power source hatch in place. Upon contact with the magnetic force of the basic magnet of the robot, the basic magnet of the IoT device may be moved, causing the hatch to open. In other examples, an electro-mechanical switch and other electro-mechanical device may be used, including but not limited to a latch, lever, bolt, or other electrically controllable mechanical device that prevents unauthorized access to the temporary power outlet.

Once the hatch is opened, the robot may connect to the IoT device and deliver an external power source to the IoT device. The connection may be made through a plug and socket, including but not limited to Types A, B, C, D, E, F, G, H, I, J, K, L, M, N, and O electrical outlet plugs specified by the U.S. Department of Commerce International Trade Administration. In other examples, the connection may be made through a Thunderbolt connection and/or USB connection, including but not limited to USB-A, USB-B, USB-C, mini-USB, micro-USB, and USB 3 connections. In yet other examples, the connection may be made through proprietary computer bus and power connectors, including but not limited to an Apple® Lightning connection. Once the robot has connected to the IoT device, external power may be transmitted from the robot to the IoT device. The external power allows the IoT device to run an authentication protocol to verify the authenticity of the robot. Similarly, the robot may run the same authentication protocol.

If authentication is successful between the robot and the IoT device, then the process of removing the old battery and inserting the new battery may begin. If the authentication is unsuccessful, an error message may be transmitted back to a central hub, and appropriate entities may be alerted, as an unsuccessful authentication may indicate an attempt to maliciously access a network, the robot, and/or IoT device without authorization.

Once the robot is authenticated by the IoT device, the IoT device may then unlock the main battery compartment so that the robot can remove the old battery and insert a new battery. In some examples, the locking mechanism of the main battery compartment may be controlled using magnets. For example, electromagnets may be used to lock and unlock the main battery compartment hatch. Using the power received from the robot, the IoT device may change the amount of electric current that flows through the electromagnet(s). Different electric currents can produce different magnetic fields, which can be used to open/close the main battery compartment hatch.

Once the battery compartment is open, the robot may then remove the old battery and insert the new battery. After successful installation of the new battery, the robot may transmit a message to the IoT device informing the IoT device that the new battery has been successfully installed. The IoT device may then run at least one test to ensure the new battery is functional, and upon successful completion of the test, the IoT device may transmit a message to the robot informing the robot that the robot may disengage its temporary power source. Upon disengaging the temporary power source, the main battery compartment hatch may be locked in place, and the temporary power outlet hatch may be closed. The IoT device may now resume normal operation.

Accordingly, the present disclosure provides a plurality of benefits including but not limited to: enabling efficient and cost-effective battery replacement; decreasing congestion caused by manual battery replacement; enabling the reuse of IoT devices; increasing uptime of IoT devices; and increasing network reliability and data transfer due to the increased uptime of IoT devices, among other examples.

FIG. 1 illustrates an example of a distributed system for automated battery replacement. Example system 100 presented is a combination of interdependent components that interact to form an integrated whole for automated battery replacement. Components of the system may be hardware components or software implemented on, and/or executed by, hardware components of the systems. For example, system 100 comprises client device 102, IoT device 104, robot device 106, local databases 110, 112, and 114, network(s) 108, and server devices 116, 118, and/or 120.

Client device 102 may be configured to receive data related to IoT devices (such as IoT device 104) and robots (such as robot 106) and communicate with other client devices, IoT devices, and robots. For instance, client device 102 may receive real-time battery level information of IoT devices and GPS location information of IoT devices and deployed robots. Client device 102 may also be configured to receive real-time updates during an automated battery replacement instance, such as notifications regarding the authentication protocol and new battery tests run by the IoT device post-installation of the new battery. IoT device 104 and robot 106 may also be configured to receive data related to client devices, IoT devices, and robots, as well as communicate with other client devices, IoT devices, and robots. In aspects, devices 102, 104, and 106 may have access to one or more data sources comprising data related to battery power limits and authentication protocols. The data sources may be local to, or external to, the devices. The data related to the battery power limits may include, for example, values indicating a threshold for battery replacement and/or algorithms calculating remaining battery life of a battery in an IoT device. The data related to authentication protocols may include, for example, values representing private and public keys, encrypted strings for passwords, Secure Sockets Layer/Transport Security Layer (SSL/TLS) data, smart cards, virtual private networking (VPN) and remote access services (RAS) information, and radio-frequency identification (RFID) data. As another example, IoT device 104 and robot 106 may execute an authentication protocol that requires IoT device 104 to compare the authentication information transmitted by robot 106 with authentication verification information stored in remote web servers or external data storage locations, such as server devices 116, 118, and/or 120.

In other examples, the authentication information for both the IoT device 104 and robot 106 may both be stored in remote web servers or external storage locations, such as server devices 116,118, and/or 120, and as such, the authentication protocol would occur over network(s) 108. In yet other examples, the authentication information for both the IoT device 104 and robot 106 may occur completely offline. For instance, if a network failure occurred while robot 106 was deployed to replace a battery on IoT device 104, robot 106 may be preloaded with requisite authentication information, stored in local database 114. Similarly, IoT device may be preloaded with authentication information stored in local database 112. As such, a successful authentication process may be completed locally on the IoT device 104 and robot 106 without connecting to network(s) 108.

Although robot 106 is depicted as an air-based robot, the distributed system depicted is only one non-limiting example. In other examples, any type of robot may be used—air, land, sea, etc. Further, any number of robots may be used. In some examples, multiple robots may be required to replace a battery on certain IoT devices.

Figure 2:
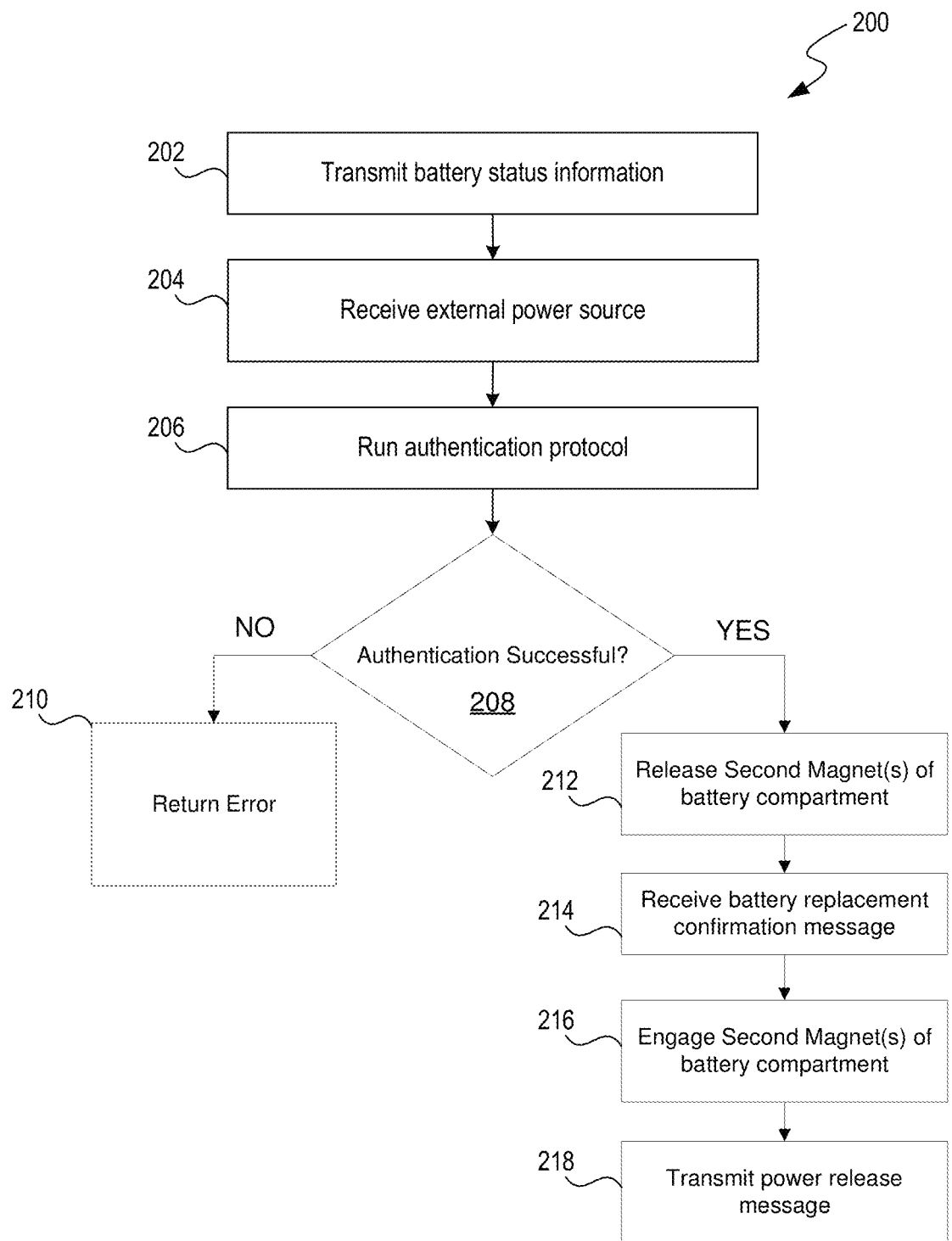
FIG. 2 illustrates an example method for automated battery replacement from the perspective of the IoT device.

FIG. 2 illustrates an example method for automated battery replacement from the perspective of the IoT device. Method 200 begins at operation 202 where battery status information is transmitted. Battery status information refers generally to the amount of charge left in the battery or batteries powering the IoT device. In some aspects, battery status information may be transmitted periodically to a remote device and/or hub. When the battery status information reaches a certain threshold, the remote device and/or hub may receive a notification that a battery or batteries need to be replaced on the IoT device.

After battery status information is transmitted, external power may be received at operation 204. In some examples, the external power may be received from a robot (such as robot 106) that was deployed from a central hub that received the battery status information from the IoT device. The external power that is received from the robot at operation 204 completes at least one circuit within the IoT device, allowing the IoT device to run an authentication protocol and, pending successful authentication, to open the main battery compartment hatch.

As previously described, the external power source may be any type of power conducting plug-socket configuration, including but not limited to the standard types of electrical outlet plugs described by the US Department of Commerce International Trade Administration, USB-type configurations, Apple® Lightning configurations, thunderbolt configurations, and PCIe configurations, among others.

At operation 206, the IoT device runs an authentication protocol. The authentication protocol may be any form of secure authentication, including but not limited to password authentication, two-factor authentication, token authentication (e.g., exchanging of public and private keys), transaction authentication, computer recognition authentication, Kerberos protocol, and SSL/TLS, among others. Further, various encryption methods may be employed to ensure proper authentication between the IoT device and the robot device. Such encryption methods may include but are not limited to DES/3DES, Blowfish, AES, Twofish, IDEA, MD5, SHA 1, HMAC, RSA, and quantum cryptographic methods (e.g., lattice-based, multivariate, hash-based, code-based, symmetric key quantum resistance, etc.).

At decision block 208, the system determines if the authentication was successful according to the authentication protocol used by the IoT device and robot. If the authentication was unsuccessful, then the method proceeds to operation 210. At operation 210, an error is returned by the IoT device. The error may be transmitted to a remote device (e.g., mobile device, personal computer, central hub, etc.), alerting the operator of the remote device that authentication was not successful. In some embodiments, after an error is returned at operation 210, the authentication protocol may be restarted, and the method will proceed back to operation 206. This process may be repeated a fixed number of times before a timeout may occur. Upon timeout, the IoT device may automatically shut-off in some instances to prevent unauthorized access to the network and IoT device. In other scenarios, the IoT device may continue running with the authentication protocol disabled, so no other external robotic device can connect with the IoT device. In such scenarios, a human technician may be required to reset the IoT device.

If the authentication is successful, the method proceeds to operation 212, where a second magnet or set of magnets is released, opening the main battery compartment on the IoT device. The second magnet(s) may be electromagnets in some instances, where the power received from the robot is used to control an electrical current to the second magnet(s), causing the second magnet(s) to disengage from the main battery compartment hatch, which may allow the hatch to open. In other examples, the second magnet(s) may be standard magnets, and upon a successful authentication, a mechanical process is triggered, moving the second magnet(s) to a different location within the IoT device, which may cause the battery compartment hatch to open. In other examples, an electro-mechanical switch and other electro-mechanical device may be used to open and close the battery hatch, including but not limited to a latch, lever, bolt, or other electrically controllable mechanical device that prevents unauthorized access to the battery compartment.

Once the battery compartment hatch is open, the robot may proceed to remove the old battery and insert the new battery. After the replacement is completed, the robot may send a confirmation message to the IoT device. At operation 214, the IoT device receives the battery replacement confirmation message. In some instances, the confirmation message may be transmitted upon successful replacement. If the replacement is not successful, the IoT device may not receive a confirmation message. After a certain period of time of not receiving a confirmation message, the IoT device may terminate the connection with the robot. In other instances, an unsuccessful replacement may result in the transmission of an error message to the IoT device. The IoT device may receive this message and subsequently terminate the connection with the robot. The IoT device may then transmit a message to a remote device and/or hub regarding the failed replacement.

If a successful replacement occurs, the IoT device will receive a confirmation message at operation 214 from the robot informing the IoT device that the old battery (or batteries) was successfully removed and the new battery (or batteries) was successfully installed.

After receiving the confirmation message, the IoT device proceeds to engage the second magnet(s) to a locking position that locks the battery compartment hatch in place. In some examples, the second magnet(s) may be electromagnets, and the IoT device may provide the electromagnets with a certain electrical current that causes the electromagnets to force the battery compartment hatch to close. In other examples, the second magnet(s) may be standard magnets that are mechanically moved back to a certain location where the magnetic force of the second magnet(s) causes the battery compartment hatch to close.

Once the battery compartment hatch is closed, the method proceeds to operation 218. At operation 218, the IoT device transmits a power release message to the robot so that the robot may disengage from the IoT device. At this step, the IoT device may resume normal operation.

Figure 3:
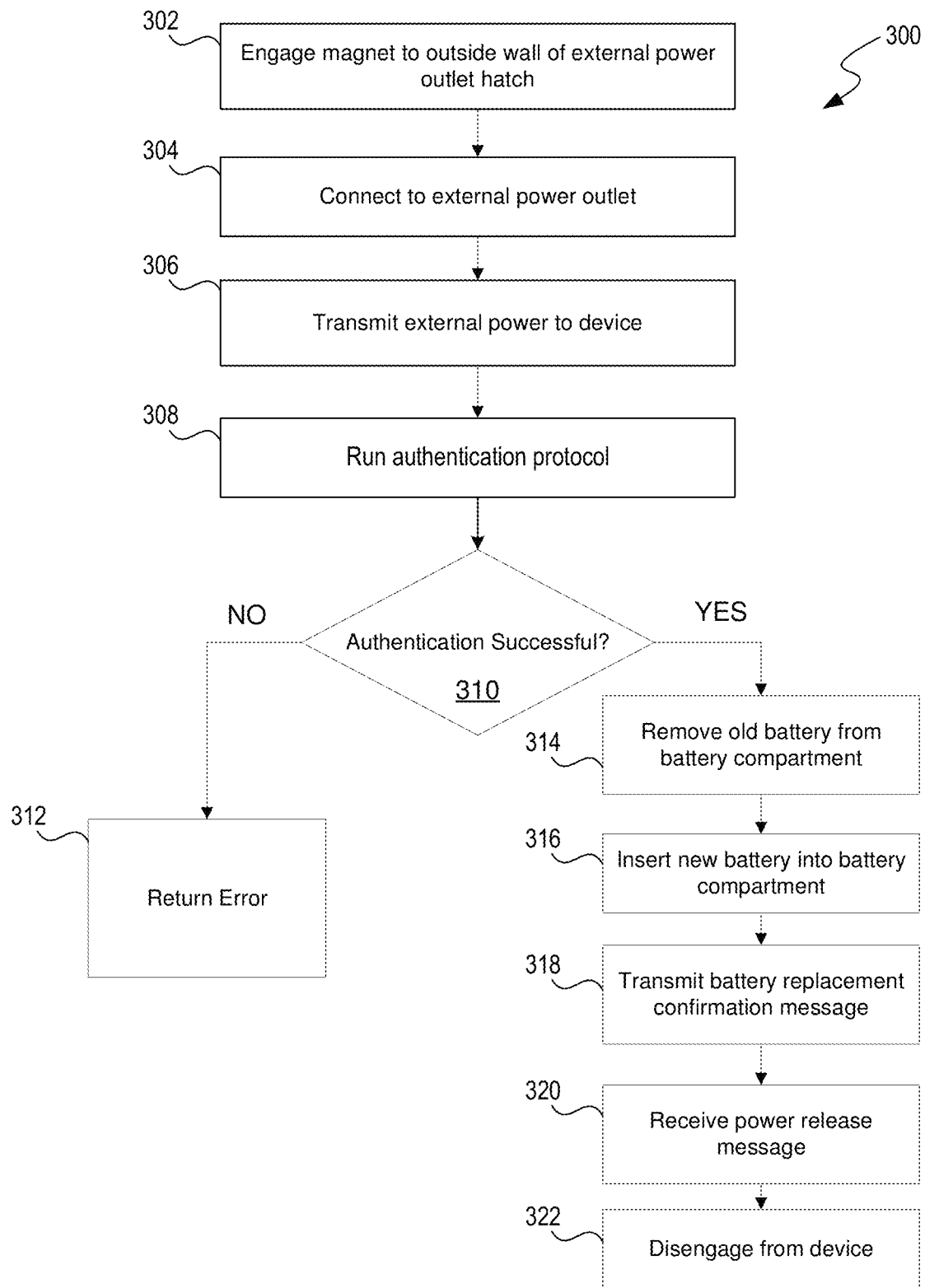
FIG. 3 illustrates an example method for automated battery replacement from the perspective of the robot.

FIG. 3 illustrates an example method for automated battery replacement from the perspective of the robot. Method 300 begins at operation 302 where a basic magnet attached to a robot is engaged to a basic magnet attached to an IoT device and keeping the external power source hatch closed. Upon engagement of the basic magnet from the robot, the magnetic force between the two magnets, may cause the basic magnet attached to the IoT device to move locations within the IoT device, causing the external power outlet hatch to slide open. As mentioned previously, in other examples, an electro-mechanical switch and other electro-mechanical device may be used, including but not limited to a latch, lever, bolt, or other electrically controllable mechanical device that prevents unauthorized access to the external power source.

Once the external power outlet hatch is open, the robot may connect to the external power outlet at operation 304. In examples, the external power outlet may be compatible with a variety of plug-socket connections, including but not limited to standard Type electrical outlets, USB-type power configurations, Apple® Lightning configurations, and PCIe configurations, among others. Once connected, the robot device may transmit external power to the IoT device at operation 306. The power provided to the IoT device may cause the IoT device to then execute an authentication protocol.

At operation 308, the robot runs an authentication protocol to ensure that the robot and IoT device are authorized to connect. As mentioned with respect to FIG. 2, the authentication protocol may comprise various algorithms, security configurations, and encryption techniques.

At decision block 310, the system checks if the authentication was successful according to the authentication protocol used by the IoT device and robot. If the authentication was unsuccessful, then the method proceeds to operation 312. At operation 312, an error is returned by the robot. The error may be transmitted to a remote device (e.g., mobile device, personal computer, central hub, etc.), alerting the operator of the remote device that authentication was not successful. In some embodiments, after an error is returned at operation 312, the authentication protocol may be restarted, and the method will proceed back to operation 308. This process may be repeated a fixed number of times before a timeout may occur. Upon timeout, the robot may automatically disengage from the IoT device.

If the authentication is successful, then the method proceeds to operation 314 where the old battery is removed from the main battery compartment. Upon successful authentication, the IoT device releases the second magnet(s) holding the main battery compartment hatch closed, as described with respect to the method from FIG. 2. Once the hatch of the main battery compartment is open, the robot may remove the old battery from the battery compartment. After the old battery is removed, the method proceeds to operation 316 where the robot inserts a new battery into the battery compartment.

Upon successful installation of the new battery, the method proceeds to operation 318 where the robot transmits a confirmation message to the IoT device, alerting the IoT device that installation was successful. In other examples, the confirmation message may also be transmitted to remote devices via network(s) 108. Once the IoT device receives the confirmation message from the robot, the IoT device may run at least one test or a series of tests to ensure operability of the new battery. In some instances, the IoT device may not run a test and simply transmit a power release message to the robot. At operation 320, the robot receives a power release message from the IoT device, causing the robot to disengage from the IoT device at operation 322. After the robot disengages from the IoT device, the IoT device may resume normal operation, and the robot may return to its original dispatch location.

Figure 4:
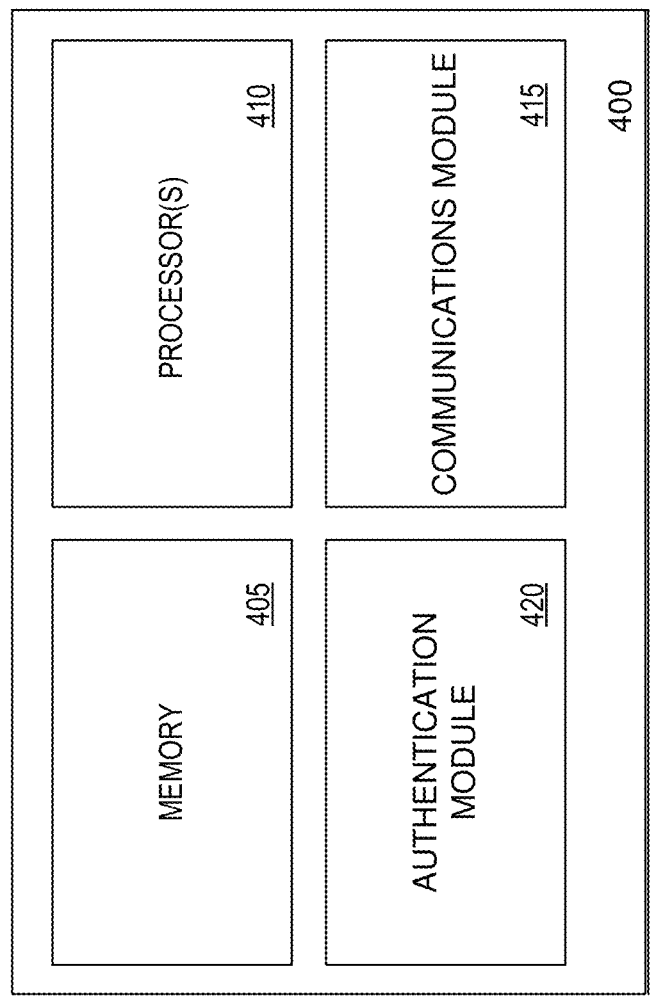
FIG. 4 illustrates an example input processing system for implementing systems and methods for automated battery replacement.

FIG. 4 illustrates an example input processing system 400 for implementing systems and methods for automated battery replacement. The input processing system is capable of executing algorithms, software routines, and/or instructions based on processing data provided by a variety of sources related to IoT devices and/or robots capable of replacing batteries. Example input processing system 400 can be embedded within an IoT device and/or a robot. According to the embodiments shown in FIG. 4, the disclosed system can include memory 405, processor(s) 410, communications module 415, and authentication module 420. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 405 can store instructions for running one or more applications or modules on processor(s) 410. For example, memory 405 could be used in one or more embodiments to house all or some of the instructions needed to execute the functionality of communications module 415 and authentication module 420. Generally, memory 405 can include any device, mechanism, or populated data structure used for storing information. In accordance with some embodiments of the present disclosures, memory 405 can encompass, but is not limited to, any type of volatile memory, nonvolatile memory, and dynamic memory. For example, memory 405 can be random access memory, memory storage devices, optical memory devices, magnetic media, floppy disks, magnetic tapes, hard drives, SIMMs, SDRAM, RDRAM, DDR, RAM, SODIMMS, EPROMS, EEPROMs, compact discs, DVDs, and/or the like. In accordance with some embodiments, memory 405 can include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 405.

Communications module 415 is associated with sending/receiving information (e.g., associated with successful/unsuccessful authentication requests between the robot and IoT device, successful/unsuccessful battery replacement, etc.) with a remote server or with one or more nearby IoT devices or robots. These communications can employ any suitable type of technology, such as Bluetooth, WiFi, WiMax, cellular, single hop communication, multi-hop communication, Dedicated Short Range Communications (DSRC), or a proprietary communication protocol. In some embodiments, communications module 415 is used to communicate information collected from authentication module 420.

Authentication module 420 is associated with the authentication protocol between the IoT device and the robot. In some embodiments, the authentication module 420 may be responsible for storing and securely transmitting a public and/or private key. In other embodiments, the authentication module 420 may be used to activate a near-field RFID chip. In yet other examples, authentication module 420 may be configured to connect to a secure network with access to remote web servers that house data used to authenticate an IoT device or a robot. For example, input processing system 400 may be embedded within an IoT device. When a robot connects to the IoT device and the authentication protocol is executed, authentication module 420 may receive authentication information transmitted from the robot, and authentication module 420 may then apply at least one encryption/decryption algorithm to verify the authenticity of the robot.

The encryption/decryption algorithm may be locally stored on the input processing system 400 (e.g., authentication module 420 is configured to retrieve a locally stored algorithm in memory 405), or, in other aspects, the encryption/decryption algorithm may be remotely stored on a remote web server accessible through a secure network. Authentication module 420 may be configured to access the secure network, and the encryption/decryption algorithms may be executed remotely.

In other examples, authentication module 420 may be configured to receive and authenticate at least one wirelessly transmitted authentication token associated with the IoT device and/or the robot. For instance, a robot attempting to connect with an IoT device may be equipped with input processing system 400 and authentication module 420. Authentication module 420 embedded within the robot may receive an authentication token wirelessly from a central hub. Similarly, the IoT device may be equipped with input processing system 400 and receive an authentication token wirelessly from a central hub to verify the authenticity of the robot. In yet other examples, a user may activate an authentication key for a robot and/or IoT device. For instance, a user may be in proximity to a robot that is approaching an IoT device, and the user may have the robot and IoT device within the user's line of sight. When the robot is within a certain proximity to the IoT device, the user may transmit an authentication token to the authentication module 420, allowing the robot and IoT device to execute an authentication protocol.

FIG. 5 illustrates an example environment of operation of the disclosed technology. As illustrated, IoT devices are affixed to the top of lightpoles on a roadway. Specifically, IoT device 506 is affixed to the top of lightpole 504. IoT device 506 may be reporting a low battery charge. The battery status information may be captured by a central hub (e.g., remote device configured to communicate to IoT devices and dispatch robots). Upon receiving the battery status information from IoT device 506, the central hub may deploy a robot 502 to replace the battery on IoT device 506. Because IoT device 506 is affixed on top of a lightpole (lightpole 504), an air-based robot (e.g., robot 502) may be the most appropriate robot to replace the battery of IoT device 506. In some examples, IoT device 506 may transmit device information to a central hub. The device information may include three-dimensional GPS coordinates and environmental data. Such data may be processed by a central hub to determine that IoT device 506 is in a location that is most easily accessible by an air-based robot. As such, the central hub may then dispatch an air-based robot to replace the battery of IoT device 506.

Once robot 502 arrives to the location of IoT device 506, robot 502 and IoT device 506 may engage one another, beginning with the robot 502 providing external power to the IoT device 506 and subsequently running an authentication protocol that authenticates both the robot 502 and IoT device 506. Once the authentication process is successfully completed, robot 502 may remove an old battery or batteries from IoT device 506 and insert a new battery or batteries into the battery compartment of IoT device 506. Upon successful installation of the new battery or batteries, the robot 502 and IoT device 506 may disengage per the respective methods described in FIGS. 2 and 3.

Figure 6A:
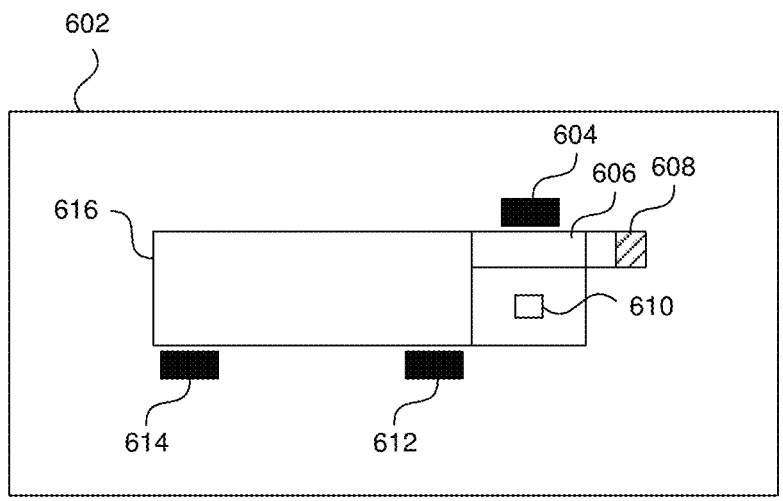
FIG. 6A illustrates an example IoT device prior to successful authentication with a robot.

FIG. 6A illustrates an example IoT device prior to successful authentication with a robot. As illustrated, IoT device 602 contains a basic magnet 604 that controls the opening and closing of the external power outlet hatch 606. In this example embodiment, a near-field RFID chip 608 is affixed to the end of the external power outlet hatch 606. Underneath hatch 606 is external power outlet 610, where a robot can insert a plug to provide external power to the IoT device. As described previously, any operable plug-socket configuration can be affixed to the IoT device and robot device. IoT device 602 also contains two strong magnets 612 and 614. These magnets 612, 614 control the opening and closing of the main battery compartment hatch 616. In other examples, magnets 612, 614 may take the form of electro-mechanical switches or other electro-mechanical devices, including but not limited to a latch, lever, bolt, or other electrically controllable mechanical device that prevents unauthorized access to the battery compartment. In yet other examples, magnets 612 and 614 may be built into battery 618 itself instead of on the side of the battery compartment 616. In such an example, the battery 618 may release itself upon successful authorization, allowing the robot to easily extract the battery 618 and insert a new battery. In some examples where the magnets 612 and 614 are built into the battery 618 itself, a battery hatch may not be needed, as the battery is securely fastened into the main battery compartment 616 due to the magnetic force from the magnets 612 and 614 inside the battery 618. In yet other examples, a single strong battery may be used to control the opening and closing of the main battery compartment hatch 616. In other examples, a more than two batteries may be used to control the opening and closing of the main battery compartment hatch 616.

Prior to a successful authentication process with a robot, the main battery compartment 616 remains closed, held in place by magnets 612 and 614. At this stage, a robot may be engaged with IoT device 602, connecting its power source to external power outlet 610. Upon connection of an external power source, IoT device 602 may run an authentication process to authenticate the robot. In other examples, the authentication process may run prior to connection of an external power source from the robot. For example, when the robot and IoT device are within a certain range (e.g., Range of Bluetooth depending on device class), the robot and IoT device may execute an authentication process. The authentication process may be successfully completed prior to the robot physically engaging with the IoT device.

The authentication process may comprise a source-code-based authentication process (e.g., exchanging of encrypted keys, passwords, etc.), an electrical process, and/or a visual process. For example, the source-code-based authentication process may comprise the exchanging of encrypted keys and/or passwords. An electrical process may comprise a physical connection between the robot and the IoT device, e.g., when the robot connects to the external power outlet of the IoT device. A visual authentication process may involve the use of an external camera affixed to the external portion of the robot and/or IoT device. For instance, the robot and/or IoT device may be equipped with at least one image recognition algorithm. From the perspective of the IoT device, the camera may capture an image of the approaching robot and authenticate the robot by validating the robot's visual characteristics using at least one image recognition algorithm.

In some aspects, authentication failure between the robot and IoT device may occur. For instance, the authentication module and/or communications module may be corrupted, so the transmission of an authentication key or password from a robot to the IoT device or from the IoT device to a robot may fail. Specifically, the robot and/or IoT device may be unable to transmit an authentication key/password or receive an authentication key/password via a wireless network. In such an instance, the robot and/or IoT device may transmit a notice of failure to a central hub, another robot, or another IoT device, each or all of which may separately assist the robot with authentication between the robot and IoT device. In other instances, the robot may proceed to take a picture of the IoT device (and/or the IoT device may proceed to take a picture of the robot). The picture may be transmitted back to the central hub for further verification. In the instance where the robot and/or IoT device cannot be verified by the central hub, the IoT device may continue in normal operation until the battery reaches a lower threshold, or the IoT device may power down to a setting akin to "sleep mode" until an authenticated robot replaces the battery.

Figure 6B:
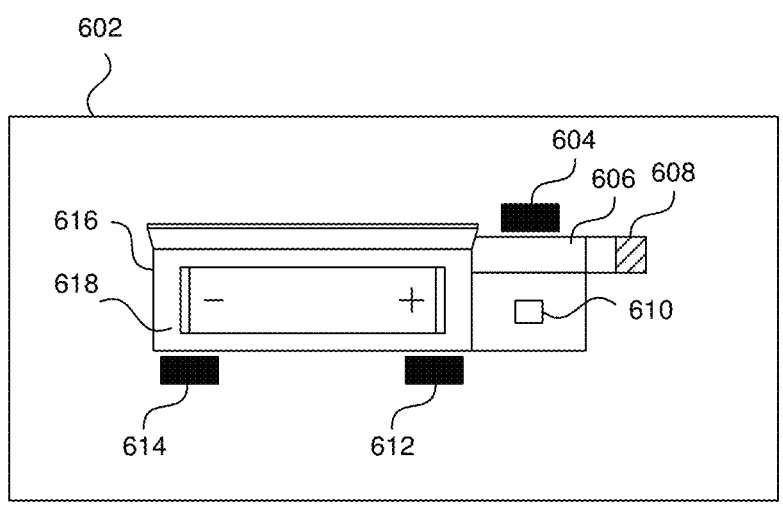
FIG. 6B illustrates an example IoT device after successful authentication with a robot.

FIG. 6B illustrates an example IoT device after successful authentication with a robot. If the authentication process is successful, then the battery compartment 616 may be opened, exposing the old battery 618. In some examples, as described before, a successful authentication procedure may result in an electrical current being transmitted to magnets 612 and 614 that change the magnetic force of the magnets 612 and 614, which may cause the battery compartment hatch 616 to open. In other examples, magnets 612 and 614 may be mechanically moved to a different location within IoT device 602, changing the magnetic force proximal to the battery compartment hatch 616, which may cause the hatch 616 to open. Upon opening of the battery compartment hatch 616, a robot may then proceed to remove the old battery 618 and install a new battery. After the new battery is installed, the IoT device may proceed to run at least one test to ensure the new battery is functioning properly within the IoT device and has adequate charge. In other examples, the testing of the new battery may occur through the robot. After installing the new battery, the robot may proceed to run at least one test to ensure the new battery is functioning properly within the IoT device and has adequate charge. Once the battery replacement process is complete, the robot may disengage from IoT device 602, and IoT device 602 may resume normal operations.

In other instances, the IoT device itself may be corrupted so that it is unable to operate correctly even if a new battery was installed. In such instances, the robot may remove the old battery 618 without replacing it, leaving the IoT device without a battery in the battery compartment. In such instances, the IoT device may require manual troubleshooting and repair.

Figure 7:
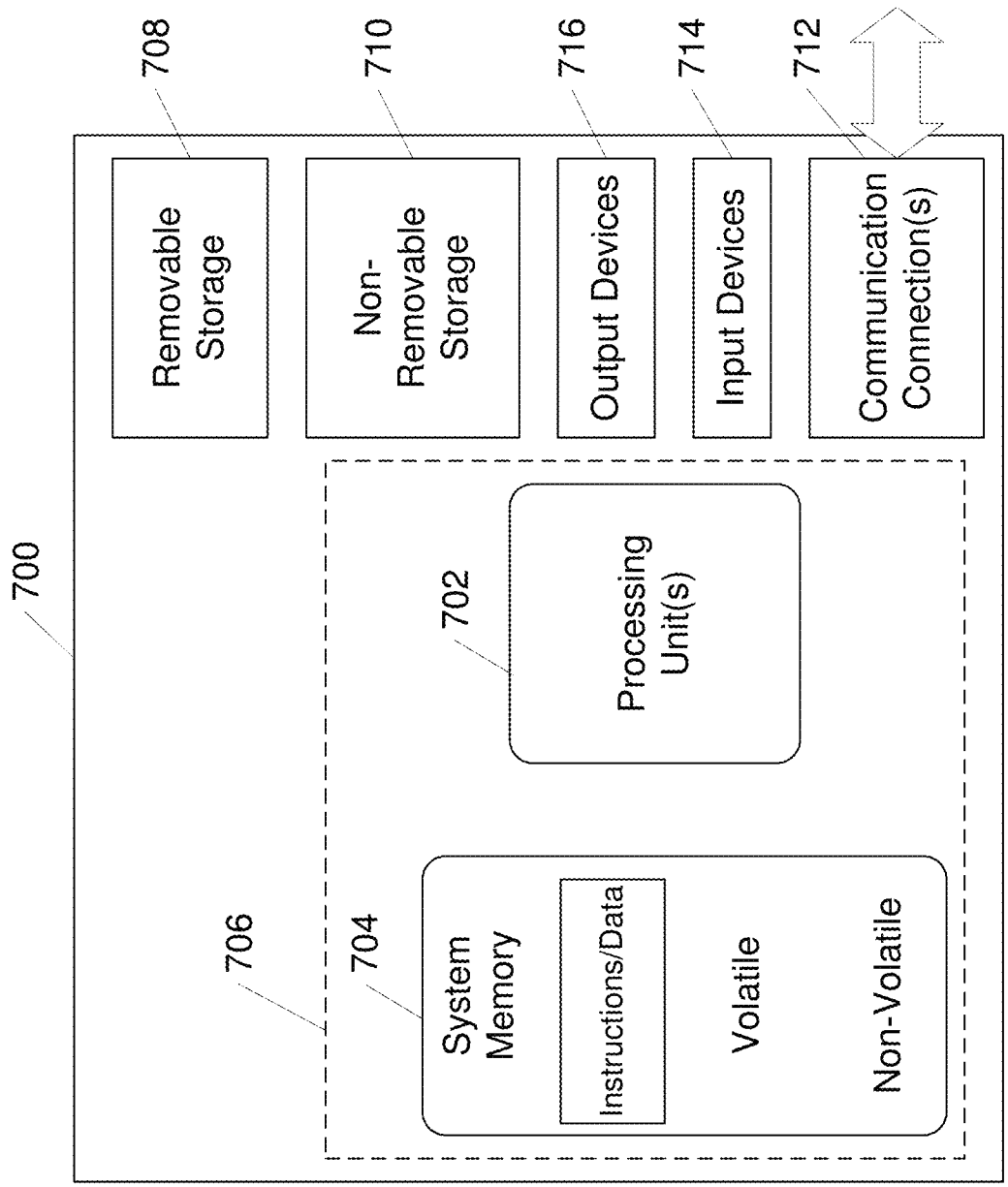
FIG. 7 illustrates one example of a suitable operating environment in which one or more of the present embodiments may be implemented.

FIG. 7 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 700 typically includes at least one processing unit 702 and memory 704. Depending on the exact configuration and type of computing device, memory 704 (storing, among other things, information related to detected devices, detected vehicles, association information, personal gateway settings, and instruction to perform the methods disclosed herein) may be volatile (such as RAM), non-volatile (such as ROM, flash memory, etc.), or some combination of the two. This most basic configuration is illustrated in FIG. 7 by dashed line 706. Further, environment 700 may also include storage devices (removable 708 and/or non-removable 710) including, but not limited to, magnetic or optical disks or tape. Similarly, environment 700 may also have input device(s) 714 such as keyboard, mouse, pen, voice input, environmental sensors, authentication sensors, etc. and/or output device(s) 716 such as a display, speakers, printer, etc. Also included in the environment may be one or more communication connections, 712, such as Bluetooth, WiFi, WiMax, LAN, WAN, point to point, etc.

Operating environment 700 typically includes at least some form of computer readable media. Computer readable media can be any available media that can be accessed by processing unit 702 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulate data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 700 may be a single computer (e.g., mobile compute, IoT device computer, robot computer, etc.) operating in a networked environment using logical connections to one or more remote computers. The remote computer may be a personal computer, a server, a router, a network PC, a peer device, an IoT device, a robot, or other common network node, and typically includes many or all of the elements described above as well as others not so mentioned. The logical connections may include any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A computer-implemented method for automated battery replacement comprising:
   receiving external power from at least one robot; executing at least one authentication protocol;
   based on a successful authentication result, disengaging at least one magnet associated with a battery compartment of a device;
   receiving a battery replacement confirmation message;
   engaging the at least one magnet associated with the battery compartment; and
   transmitting at least one power release message to the at least one robot, wherein the at least one power release message is configured to enable the at least one robot to disengage from the battery compartment, wherein the battery compartment is configured to accommodate a battery for powering the device when the battery is placed in the battery compartment.

2. The method of claim 1, wherein the at least one robot is one of: a land-based robot, an air-based robot, and a water-based robot.

3. The method of claim 1, wherein the external power from the at least one robot is transmitted via at least one of the following power configurations: Type A, Type B, Type C, Type D, Type E, Type F, Type G, Type H, Type I, Type J, Type K, Type L, Type M, Type N, Type O, USB-A, USB-B, USB-C, Mini-USB, Micro-USB, USB 3, Lightning, Thunderbolt, and PCIe.

4. The method of claim 1, wherein the at least one authentication protocol is at least one of: password authentication, two-factor authentication, token authentication, transaction authentication, computer recognition authentication, Kerberos, and SSL/TSL.

5. The method of claim 4 further comprising utilizing at least one of the following encryption protocols: DES/3DES, Blowfish, AES, Twofish, IDEA, MD5, SHA 1, HMAC, RSA, and quantum.

6. The method of claim 1, wherein the at least one magnet is an electromagnet.

7. The method of claim 1, wherein battery status information comprises at least one value indicating a charge level of a battery.

8. A computer-implemented method for automated battery replacement comprising:
   receiving external power from at least one robot; executing at least one authentication protocol;
   based on a successful authentication result, disengaging at least one magnet associated with a battery compartment of a device;
   receiving a battery replacement confirmation message;
   engaging the at least one magnet associated with the battery compartment; and
   transmitting at least one power release message to the at least one robot, wherein the at least one power release message is configured to enable the at least one robot to disengage from the battery compartment, and wherein the authentication protocol comprises at least one RFID chip.

9. The method of claim 1, wherein the battery replacement confirmation message comprises information indicating that at least one battery was installed successfully, the battery replacement confirmation message received from at least one of: the at least one robot and an IoT device.

10. A system comprising:
    at least one processor; and
    memory coupled to the at least one processor, the memory comprising computer executable instructions that, when executed by the at least one processor, performs a method comprising:
      placing a first basic magnet in proximity to a second basic magnet, wherein the second basic magnet is affixed to a hatch covering at least one external power outlet on an IoT device;
      connecting to the at least one external power outlet affixed to the IoT device; transmitting external power to the IoT device;
      authenticating the IoT device by executing at least one authentication protocol; based on a successful authentication result, removing a first battery from the IoT device;
      inserting a second battery into the IoT device;
      transmitting at least one battery replacement confirmation message; receiving at least one power release message; and
      disengaging from the IoT device, wherein the at least one power release message is configured to enable the at least one robot to disengage from a battery compartment of the IoT device.

11. The method of claim 10, wherein the IoT device is at least one of: a smart sensor, a smart monitoring device, a smart security device, a smart weather device, and a smart speaker.

12. The method of claim 10, wherein the external power is transmitted via at least one of the following power configurations: Type A, Type B, Type C, Type D, Type E, Type F, Type G, Type H, Type I, Type J, Type K, Type L, Type M, Type N, Type O, USB-A, USB B, USB-C, Mini-USB, Micro-USB, USB 3, Lightning, Thunderbolt, and PCIe.

13. The method of claim 10, wherein the at least one authentication protocol is at least one of: password authentication, two-factor authentication, token authentication, transaction authentication, computer recognition authentication, Kerberos, and SSL/TSL.

14. The method of claim 13 further comprises utilizing at least one of the following encryption protocols: DES/3DES, Blowfish, AES, Twofish, IDEA, MD5, SHA 1, HMAC, RSA, and quantum.

15. The method of claim 10, wherein the authentication protocol comprises at least one RFID chip.

16. The method of claim 10, wherein the battery replacement confirmation message comprises information indicating that at least one battery was installed successfully.

17. The method of claim 10, wherein the first basic magnet is affixed to a robot.

18. The method of claim 17, wherein the robot is at least one of: a land-based robot, an air-based robot, and a water-based robot.

19. An input processing computer comprising:
a memory;
a processor coupled to the memory, wherein the processor is configured to:
receive battery status information from at least one IoT device;
receive device information from the at least one IoT device;
evaluate the battery status information and the device information;
based on the evaluation, identify at least one robot configured to replace at least one battery on the at least one IoT device;
dispatch the at least one robot; and
receive at least one battery replacement status update from the at least one robot and the at least one IoT device,
wherein the at least one robot is configured to receive a power release message, and wherein the power release message is configured to enable the at least one robot to disengage from a battery compartment of the at least one IoT device, wherein the battery compartment is configured to accommodate a battery for powering the IoT device when the battery is placed in the battery compartment.

20. The computer of claim 19, wherein the device information comprises at least one of: a set of GPS coordinates, a device identifier, operating system characteristics, altitude, and date of last battery replacement.

* * * * *